US 6,715,713 B2

(12) United States Patent
Marche

(10) Patent No.: US 6,715,713 B2
(45) Date of Patent: Apr. 6, 2004

(54) EXCHANGER FOR AIRCRAFT AIR CONDITIONING CIRCUIT AND INTEGRATED PROPULSION ASSEMBLY FOR SUCH AN EXCHANGER

(75) Inventor: Hervé Marche, Roquettes (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/443,597

(22) Filed: May 21, 2003

(65) Prior Publication Data
US 2003/0218096 A1 Nov. 27, 2003

(30) Foreign Application Priority Data
May 22, 2002 (FR) .............................. 02 06218

(51) Int. Cl.⁷ .............................................. B64D 13/00
(52) U.S. Cl. ...................... 244/57; 244/118.5; 165/41; 165/166
(58) Field of Search ..................... 244/57, 58, 53 R, 244/118.5, 129.1; 165/41, 164–167

(56) References Cited

U.S. PATENT DOCUMENTS

| 2,367,223 | A | * | 1/1945 | Larrecq | 244/41 |
| 2,816,740 | A | | 12/1957 | Huet | |
| 3,311,166 | A | | 3/1967 | Southam | |
| 3,847,211 | A | * | 11/1974 | Fischel et al. | 165/166 |
| 4,461,344 | A | | 7/1984 | Allen et al. | 165/110 |
| 5,137,230 | A | * | 8/1992 | Coffinberry | 244/118.5 |
| 5,482,229 | A | | 1/1996 | Asshauer | 244/118.5 |
| 5,913,360 | A | * | 6/1999 | Stark | 165/166 |
| 5,915,469 | A | * | 6/1999 | Abramzon et al. | 165/166 |
| 6,364,007 | B1 | * | 4/2002 | Fischer | 165/166 |

FOREIGN PATENT DOCUMENTS

| EP | 0 964 219 | 12/1999 |
| FR | 882 208 | 5/1943 |
| FR | 2 485 473 | 12/1981 |
| FR | 2 563 491 | 10/1985 |

* cited by examiner

Primary Examiner—Galen L. Barefoot
(74) Attorney, Agent, or Firm—Thelen Reid & Priest, LLP

(57) ABSTRACT

An exchanger (10) intended for cooling air admitted into an air conditioning circuit of an aircraft is housed inside the rigid caisson of the strut by which a turboreactor is suspended from the wing unit. The exchanger comprises superposed hollow plates (12) forming air guides for the relatively cold air drawn off in the fan duct of the turboreactor. More precisely, this air is drawn off at the front, alternatively on both sides of the exchanger, via each of the plates (12). It is released behind and on the opposite side. The warm air intended for the air conditioning circuit circulates from front to back between the plates (12).

5 Claims, 4 Drawing Sheets

EXCHANGER FOR AIRCRAFT AIR CONDITIONING CIRCUIT AND INTEGRATED PROPULSION ASSEMBLY FOR SUCH AN EXCHANGER

CROSS-REFERENCE TO RELATED APPLICATION

This application claims priority based on French Application No. 02 06218, entitled "Exchanger For Aircraft Air Conditioning Circuit And Integrated Propulsion Assembly For Such An Exchanger" by Herve Marche, filed on May 22, 2002, and which was not published in English."

DESCRIPTION

1. Technical Domain

The invention mainly relates to a heat exchanger, intended to provide cooling of air introduced to an air conditioning circuit of an aircraft cabin.

More precisely, the invention relates to a heat exchanger integrated into a strut by which a turboreactor of an aircraft is suspended from the wing unit.

The invention also relates to an aircraft propulsion assembly, comprising a turboreactor, a strut and an exchanger integrated into the strut.

The invention is applied to any type of aircraft and especially to airliners intended for passenger transport.

2. Prior Art

On existing aircraft it is usual to draw off warm air in the turboreactors and then inject it into the air conditioning circuit of the pressurised cabin housing the crew and passengers.

Given that the air temperature drawn off in the reactor is generally around 400° C., whereas the maximum temperature of the air circulating in the air conditioning circuit should not exceed around 200° C., a heat exchanger is usually placed between the reactor and the air conditioning circuit. This exchanger ensures cooling of the air at high temperature originating from the reactor due to heat exchange between this air at high temperature and the colder air (at around 100° C.) drawn off in the fan duct of the turboreactor.

Given that heat exchanges taking place inside the exchanger concern two flows of air issuing from the reactor, it is usual to place the exchanger in the immediate proximity of the latter. More precisely, the exchanger is usually integrated in the structure of the strut by which the reactor is suspended under the wing unit of the aircraft.

A known solution consists of mounting the exchanger above the front part of the caisson forming the rigid structure of the strut and inside the fairing covering said caisson.

In this case, the exchanger usually comprises vertical hollow plates between which relatively cold air originating from the exhaust manifold circulates from top to bottom, and is then ejected to the exterior, into the atmosphere, via ducts formed in the upper fairing of the strut. The relatively warm air originating from the central part of the engine circulates from front to rear inside the vertical hollow plates, to be cooled there before being channelled towards the air conditioning circuit. The relatively cold air originating from the exhaust manifold is introduced to the exchanger via tubing fitted with a valve allowing the flow to be regulated. Such regulation of the relatively cold air flow inside the exchanger enables the temperature of the air in the air conditioning circuit to be controlled.

Exchangers of this type have various disadvantages.

In the first place, implanting them above the front part of the rigid caisson of the strut would create swelling in the upper front part of the fairing, if this type of exchanger were used on an aircraft equipped with reactors larger in diameter than those which equipped it during design. Using reactors of larger diameter can especially be motivated by a desire to reduce the sound level and/or increase the performance of the aircraft, and in particular its speed. The resulting swelling would jeopardise the aerodynamic flow of air in the zone between the wing unit and the reactor. This is therefore unacceptable.

Another disadvantage of existing exchangers concerns releasing to the atmosphere the relatively cold air used to cool the air injected into the air conditioning circuit. This release to the atmosphere is practically imposed by circulation from bottom to top of the relatively cold air inside the exchanger, while the relatively moderate temperature of the rejected air would allow it to be used to cool certain warm parts of the engine.

DESCRIPTION OF THE INVENTION

The main aim of the invention is to provide an exchanger for cooling air introduced to an air conditioning circuit of an aircraft cabin, said exchanger being designed so as to be able to be installed in the very interior of the caisson of the strut, so as to avoid any risk of creating swelling when it is used on an aircraft equipped with reactors of larger diameter.

The invention also aims to provide an exchanger for cooling air introduced to an air conditioning circuit of an aircraft cabin, whereof the original design allows it to use the relatively cold air exiting from the exchanger for cooling the warm parts of the engine.

According to the present invention these aims are achieved, at least in part, due to an exchanger for cooling air, for an air conditioning circuit of an aircraft, said exchanger comprising an intake manifold and an exhaust manifold of relatively warm air, placed respectively in front of and behind the exchanger, and guides for relatively cold air, each having an inlet port and an outlet port, said guides delimiting between them passages connecting the intake manifold and the exhaust manifold, characterised in that the inlet ports and outlet ports of each guide of relatively cold air terminate on two opposite lateral faces of the exchanger, respectively on a front part and on a rear part of said lateral faces, the exchanger further comprising a first flow control door, placed on the front of each lateral face on which the inlet ports of the hollow plates terminate.

Accordingly, according to the present invention, the air used to cool the air injected into the air conditioning circuit of the aircraft circulates transversally in the exchanger, between its two lateral faces. It therefore becomes possible to place the exchanger right inside the rigid caisson of the strut, thus hypothetically avoiding the development of swelling where a reactor of larger diameter than that which originally equipped the aircraft would be used, at the time of design. On the other hand, this arrangement allows cooling air rejected by the exchanger to be used to cool certain warm parts of the engine.

According to a preferred embodiment of the invention, the guides for relatively cold air are superposed hollow plates, substantially horizontal.

In this case, the inlet ports of the hollow plates are preferably positioned alternatively in front of one and the other of said opposite lateral faces. This results in crossed circulation of the relatively cold air over the entire height of the exchanger.

The exchanger also comprises, advantageously, a second flow control door, placed on the rear part of each lateral face on which the outlet ports of the hollow plates terminate.

Another object of the invention is an aircraft propulsion assembly, comprising a turboreactor having a central engine and an engine nacelle delimiting between them a fan duct, a strut by which the reactor is designed to be suspended from a wing unit element of the aircraft, and an exchanger for cooling air, for an air conditioning circuit of an aircraft cabin, in which said exchanger is realised in the manner described hereinabove and placed in a strut in such a way that the outlet ports of air guides terminate in the fan duct of the turboreactor.

BRIEF DESCRIPTION OF DIAGRAMS

A preferred embodiment of the invention will now be described, illustratively and non-limiting, with reference to the attached diagrams, in which.

DETAILED EXPLANATION OF A PREFERRED EMBODIMENT

Figure 1:
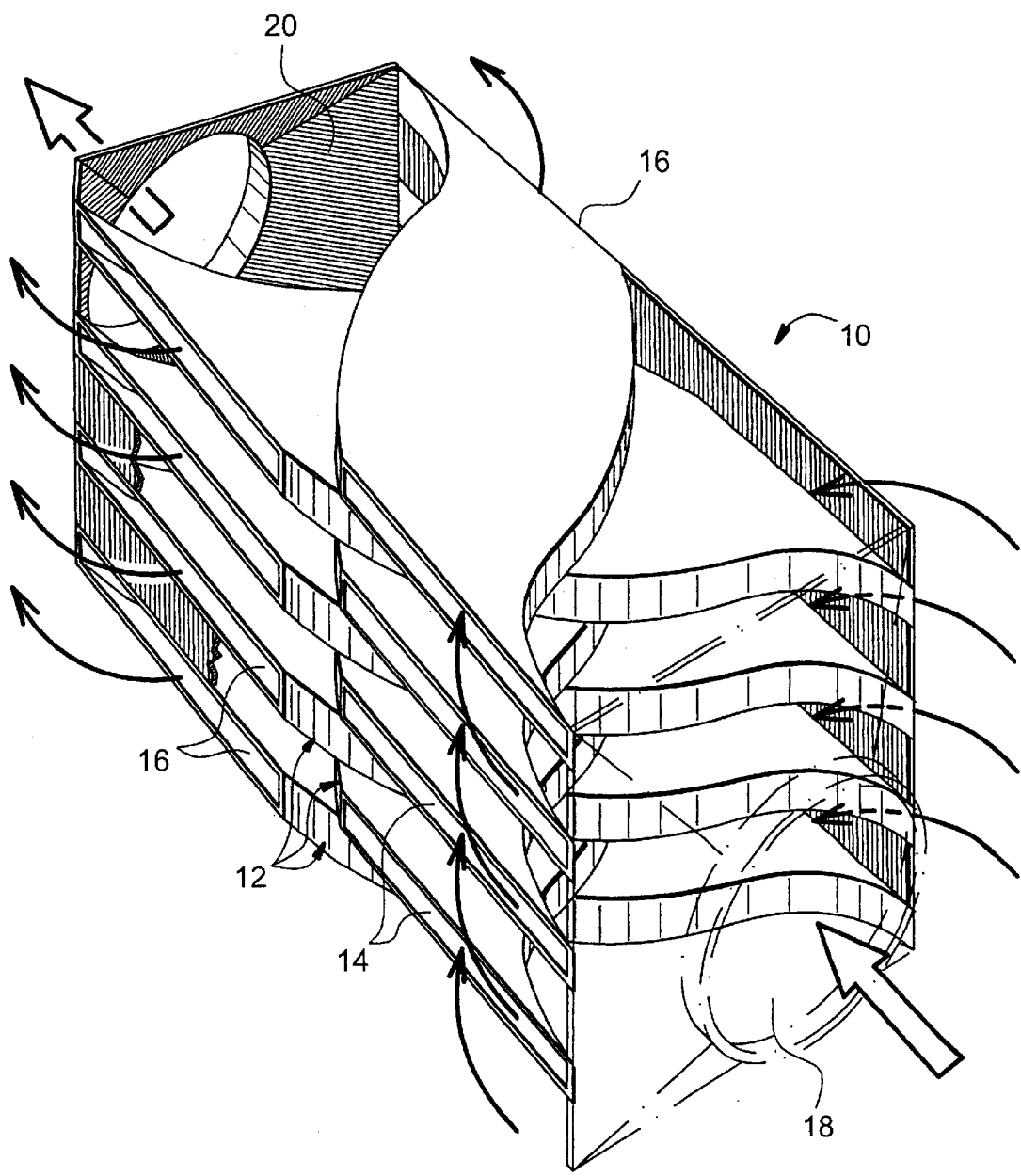
FIG. 1 is a perspective view illustrating an exchanger for cooling air according to the present invention, in which the flow control doors have been deliberately omitted.
Figure 2:
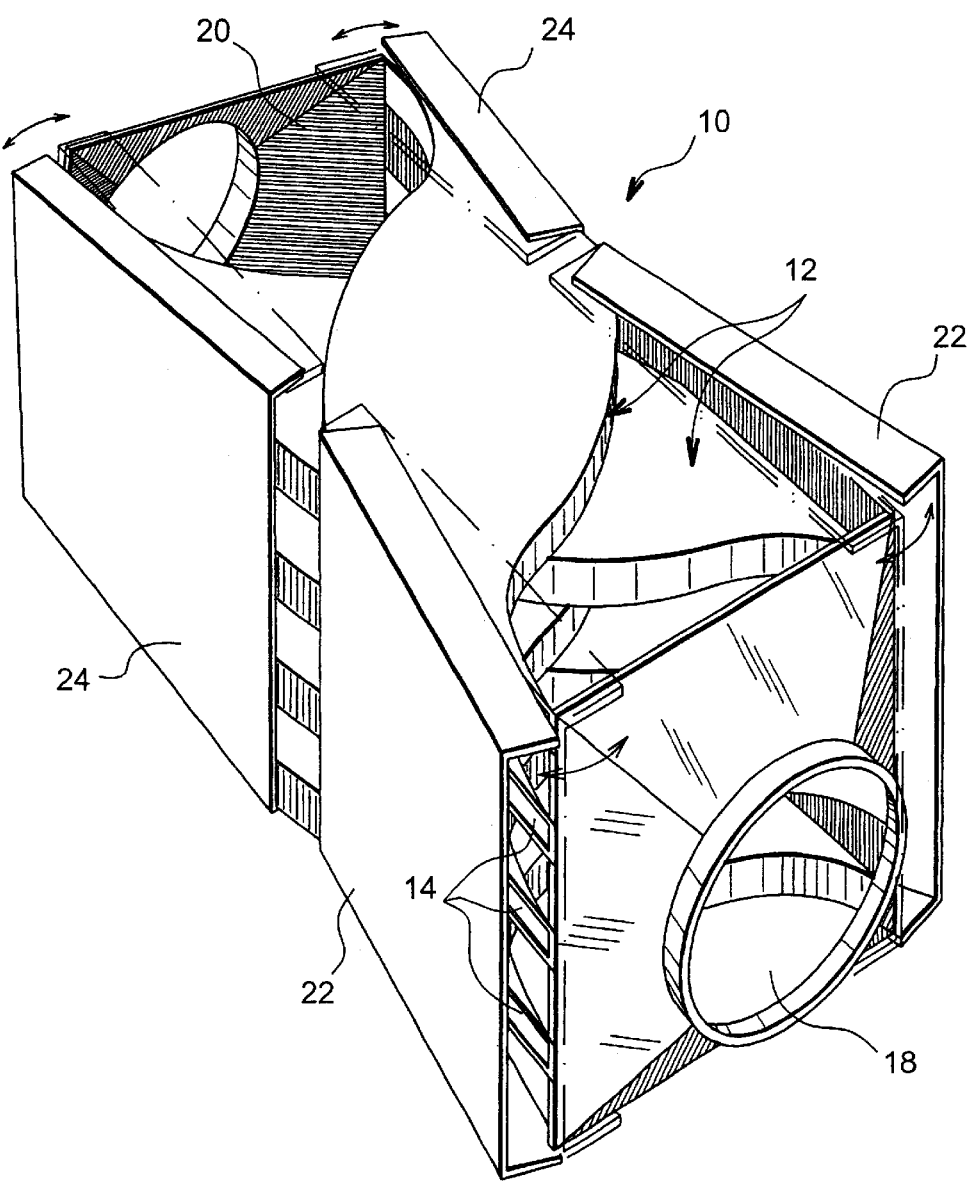
FIG. 2 is a comparable view to FIG. 1, in which the flow control doors are present and illustrated in their open state.

FIGS. 1 and 2 illustrate a preferred embodiment of an exchanger 10 for cooling air according to the present invention. More precisely, FIG. 1 illustrates the exchanger 10 without its flow control doors and FIG. 2 illustrates the exchanger 10 complete, that is, equipped with its flow control doors. The flow control exchanger 10 according to the present invention is designed to ensure cooling of air admitted to an air conditioning circuit contained in the cabin of an aircraft.

As illustrated in FIG. 1, the exchanger 10 generally has the form of a rectangular parallelepiped and presents two substantially vertical lateral faces, substantially horizontal lower and upper faces, as well as substantially vertical front and rear faces. The terms 'lateral faces', 'lower and upper faces' and 'front and rear faces' make reference to the orientation of the exchanger when it is placed inside the strut of an aircraft, as will be explained in greater detail hereinbelow with reference to FIGS. 3 and 4.

In the illustrated embodiment the exchanger 10 comprises a plurality of superposed hollow plates 12, substantially planar and horizontal. The hollow plates 12 form guides for relatively cold air in which cooling air drawn off in the fan duct of the turboreactor circulates, as will be better understood hereinbelow.

The air guide formed by each of the hollow plates 12 comprises an inlet port 14 and an outlet port 16. The inlet port 14 terminates on one of the opposite lateral two faces of the exchanger, on a front part of said face, and the outlet port 16 terminates on the other of said opposite lateral faces of the exchanger, on a rear part of said face, as shown in particular in FIG. 1.

More precisely, the inlet ports 14 of the hollow plates 12 terminate alternatively in the front part of one and the other of the opposite lateral faces of the exchanger 10. As a consequence, the outlet ports 16 of the hollow plates 12 terminate alternatively in the rear part of one and the other of the opposite lateral faces of the exchanger 10.

The hollow plates 12, substantially horizontal, are assembled with one another by way of a rigid frame (not illustrated) which delimits between said plates 12 spaces forming passages for the relatively warm air intended for the air conditioning circuit of the aircraft.

The passages formed between the hollow plates 12 terminate respectively on the front face and on the rear face of the exchanger, in an inlet manifold 18 and in an exhaust manifold 20. Internal partitions (not shown) interconnect the hollow plates 12 on the two lateral faces of the exchanger, so as to canalise the relatively warm air which escapes into said passages between the manifolds 18 and 20.

In the embodiment shown in FIG. 2, the exchanger 10 further comprises two front doors 22 for flow control and two rear doors 24 for flow control.

The front doors 22 cover the front parts of the lateral faces of the exchanger 10, so that they are opposite the inlet ports 14 of the superposed hollow plates 12. More precisely, the front doors 22 are articulated on the lateral faces of the exchanger 10 by substantially vertical axes situated in central parts of said faces. The front doors 22 can thus occupy different intermediate positions between a fully closed position and a fully open position, as illustrated in FIG. 2.

The rear doors 24 cover the rear parts of the lateral faces of the exchanger 10, such that they are opposite the outlet ports 16 of the superposed hollow plates 12. More precisely, the rear doors 24 are articulated on the lateral faces of the exchanger 10 by substantially vertical axes situated in central parts of said faces, in the vicinity of the axes of articulation of the front doors 22. As for the front doors 22, the rear doors 24 can thus assume different intermediate positions between a fully closed position and a fully open position, as illustrated in FIG. 2.

The movements of the front doors 22 and rear doors 24 are controlled by solenoids (not illustrated) such as jacks, in response to control signals for opening or closing emitted by a control unit (not illustrated). The latter is itself sensitive to signals transmitted, for example, by sensors placed in the exhaust manifold 20 of the relatively warm air which feeds the air conditioning circuit.

Accordingly, the temperature of the relatively cold air, exiting from the exchanger via the exhaust manifold 20, can be regulated by acting on the doors 22 and 24. In this way the temperature of the air in the air conditioning circuit of the aircraft cabin can be maintained at a level not exceeding around 200° C., by using warm air at around 400° C. originating from the engine, cooled by cool air at around 100° C. drawn off in the fan housing.

Figure 3:
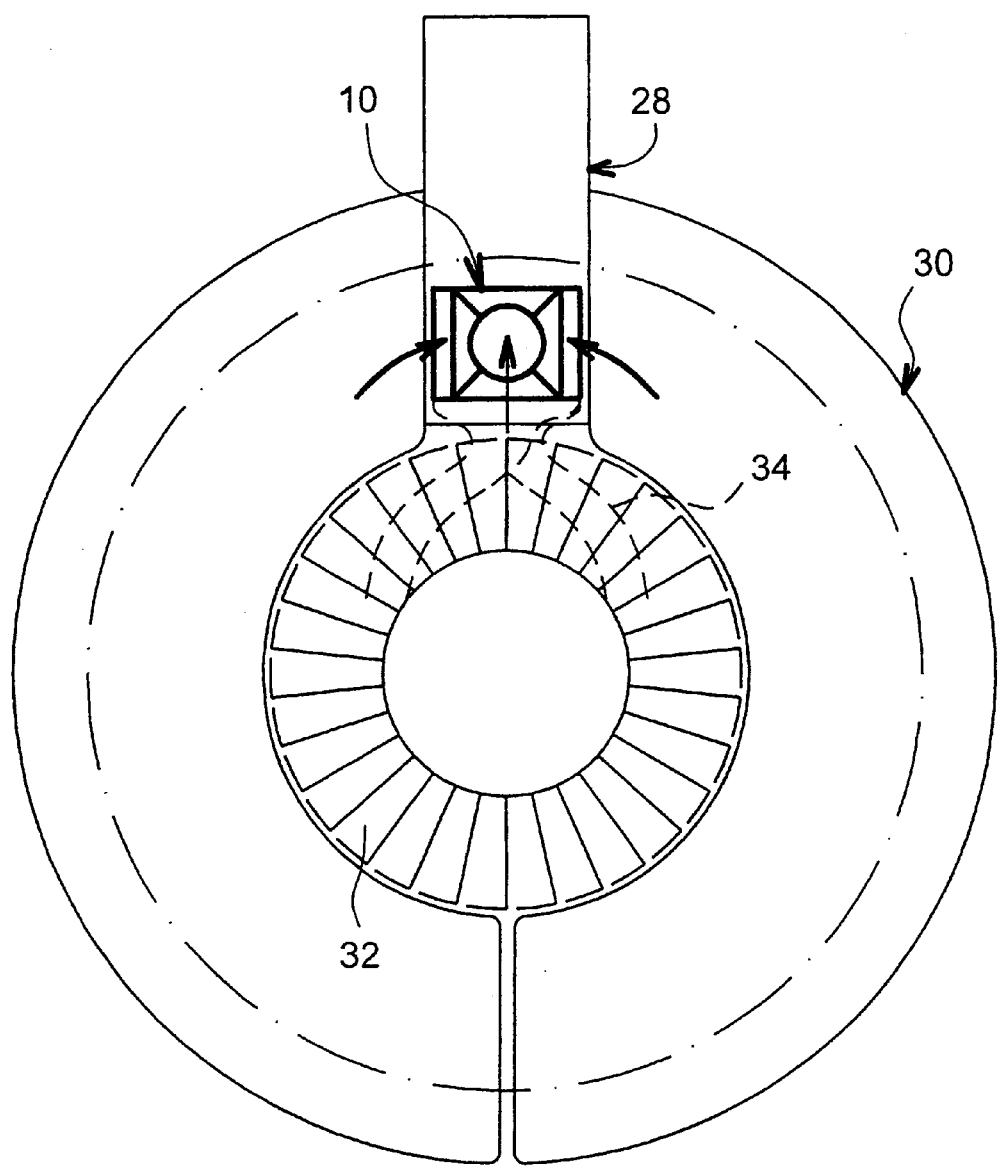
FIG. 3 is a transversal sectional view which diagrammatically illustrates an assembly comprising an aircraft turboreactor, the strut by which the latter is suspended from the wing unit and an exchanger such as illustrated in FIGS. 1 and 2 integrated into the strut.
Figure 4:
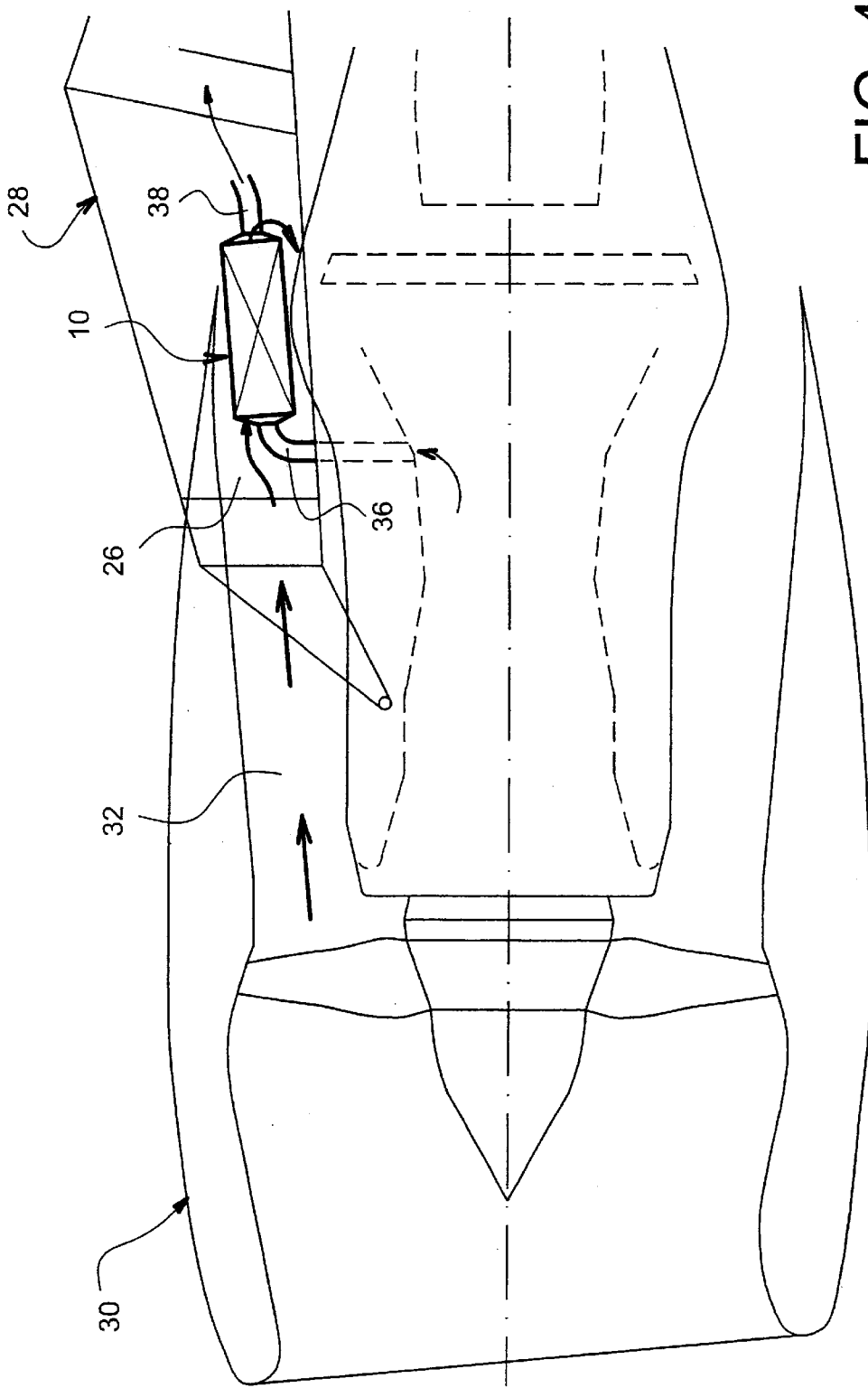
FIG. 4 is a diagrammatic view in longitudinal section of the assembly illustrated in FIG. 3.

As shown in FIGS. 3 and 4, the exchanger 10 is placed advantageously inside the rigid caisson 26 forming the framework of the strut 28 by which a turboreactor 30 is suspended from the wing unit of an aircraft.

More precisely, FIG. 4 demonstrates that the exchanger 10 is mounted in the strut 28 such that it is located in the rear part of the fan duct 32 of the turboreactor 30, at the level of the thrust reverser of the latter.

This arrangement of the exchanger 10 allows the inlet ports 14 of the hollow plates 12 to be positioned directly in the flow of relatively cold air circulating inside the fan duct 32 of the turboreactor 30. The flow of relatively cold air evacuated via the outlet ports 16 of the hollow plates 12 is, as required, either evacuated directly into the fan duct 32, or returned via ducts 34 which lead it to the warm central parts of the engine in order to cool them.

Moreover the inlet manifold 18 of relatively warm air communicates with a relatively warm zone of the central part of the engine via a tube 36, so as to be fed with relatively warm air, at a temperature generally close to 400° C. The cooled air escaping the exchanger via the exhaust manifold 20 is in turn conveyed to the air conditioning circuit of the aircraft via a tube 38.

The preceding description demonstrates that using an exchanger according to the present invention allows the latter to be placed right inside the rigid caisson of the strut, by which the turboreactor is suspended from the wing unit of the aircraft. This avoids the development of swelling at the front of the upper part of the fairing of the strut. Consequently, the flow of air between the turboreactor and the wing unit is not perturbed by the presence of the exchanger, even when the aircraft is equipped with a reactor of larger diameter than that it was intended to receive, during design.

The original conception of the exchanger according to the present invention further allows the relatively cold air which has served to cool the air injected into the air conditioning circuit not to be released to the atmosphere. Thus, as described hereinabove, this relatively cold air can be either returned to the fan duct, or utilised to cool certain parts of the central engine.

Of course the invention is not limited to the exemplary embodiment described hereinabove. The form and arrangement of the air guides as well as the form and arrangement of the flow control doors can in particular be different to those described. In addition, the flow control doors situated opposite the outlet ports of the relatively cold air can optionally be removed without departing from the scope of the invention. Finally, instead of being housed inside the caisson of the strut, as in the embodiment described, the exchanger according to the present invention can also be installed outside the structure of the strut and especially below the latter.

What is claimed is:

1. An exchanger for cooling air, for an aircraft air conditioning circuit, said exchanger comprising an inlet manifold and an exhaust manifold of relatively warm air, placed respectively in front of and behind the exchanger, and guides for relatively cold air, each having an inlet port and an outlet port, said guides delimiting between them passages connecting the inlet manifold and the exhaust manifold, in which the inlet ports and outlet ports of each guide of relatively cold air terminate on two opposite lateral faces of the exchanger, respectively on a front part and on a rear part of said lateral faces, the exchanger further comprising a first flow control door, placed on the front part of each lateral face on which the inlet ports of the hollow plates terminate.

2. The exchanger as claimed in claim 1, in which the guides for relatively cold air are substantially horizontal superposed hollow plates.

3. The exchanger as claimed in claim 2, in which the inlet ports of the hollow plates are placed alternatively in front of one and the other of said opposite lateral faces.

4. The exchanger as claimed in claim 1, further comprising a second flow control door, placed on the rear part of each lateral face on which the outlet ports of the hollow plates terminate.

5. An aircraft propulsion assembly comprising a turboreactor having a central engine and an engine nacelle delimiting between them a fan duct, a strut by which the turboreactor is designed to be suspended from a wing unit element of the aircraft, and an exchanger for cooling air, for an air conditioning circuit of an aircraft cabin, in which said exchanger is realised as claimed in any one of the preceding claims and placed in the strut such that the outlet ports of the air guides terminate in the fan duct of the turboreactor.

* * * * *